(No Model.)
J. H. SEWALL.
HOSE COUPLING.
No. 375,572. Patented Dec. 27, 1887.
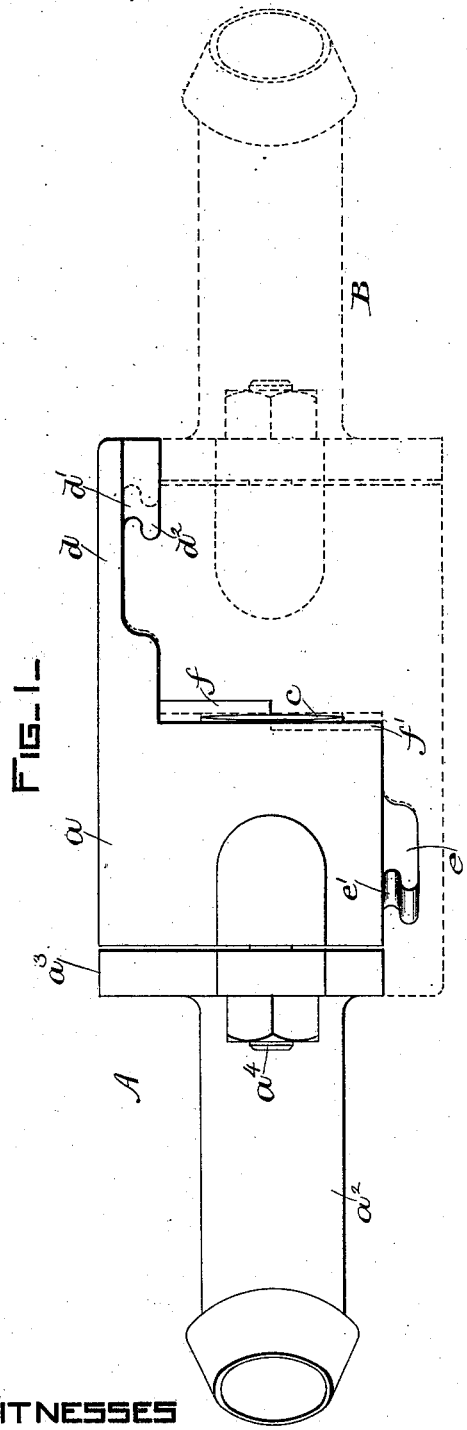
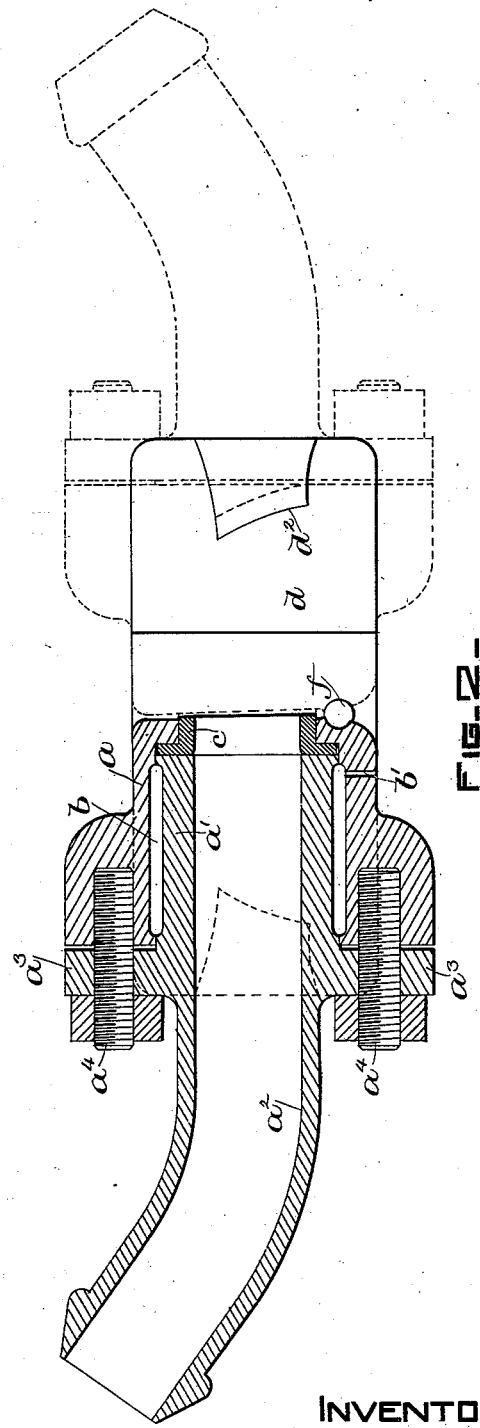
WITNESSES
Howard F. Eaton
Fred. L. Emery
INVENTOR
James H. Sewall
by Crosby & Gregory
attys.
N. PETERS, Photo-Lithographer, Washington, D. C.

UNITED STATES PATENT OFFICE.

JAMES H. SEWALL, OF PORTLAND, MAINE.

HOSE-COUPLING.

SPECIFICATION forming part of Letters Patent No. 375,572, dated December 27, 1887.

Application filed May 9, 1887. Serial No. 237,561. (No model.)

*To all whom it may concern:*

Be it known that I, JAMES H. SEWALL, of Portland, county of Cumberland, and State of Maine, have invented an Improvement in Hose-Couplings, of which the following description, in connection with the accompanying drawings, is a specification, like letters on the drawings representing like parts.

This invention has for its object to construct a hose-coupling especially adapted for connecting hose, for conveying steam from a locomotive-boiler from one car to another, and is an improvement upon application for Letters Patent of the United States, Serial No. 216,615, filed by me October 19, 1886.

In accordance with this invention each half of the coupling is made substantially alike. Each half is composed of a shell or casing bored to receive one end of a tubular nozzle, which latter is provided with a flange which overlaps the end of the shell or casing, and a bolt passes through the flange into the shell or casing to secure the nozzle firmly in position. A flanged gasket is placed within the shell or casing, against which the end of the nozzle which enters the shell or casing presses, the gasket slightly protruding from the abutting face of the shell or casing to co-operate with the gasket of the other half of the coupling. An air-space is formed between the side of the nozzle and the inner side of the shell or casing, which aids in preventing condensation. The shell or casing of each half of the coupling is provided at one side with a broad extension having a locking-flange, and upon the other side with a projection having a groove or passage, so that when the two halves of the coupling are placed together the locking-flanges engage the grooved projections correspondingly. A suitable joint or hinged connection is provided, a co-operative part of which is formed upon each half of the coupling, substantially as in the application referred to.

Figure 1 shows in top view a hose-coupling embodying this invention, and Fig. 2 a longitudinal section of the coupling.

The two halves A B of the coupling being made substantially alike, one only will be described, together with its co-operation with the other half. The portion or half A of the coupling is composed of the shell or casing $a$, bored to receive the end $a'$ of the tubular nozzle $a^2$. The nozzle $a^2$ is provided with a flange, $a^3$, which abuts against the end of the shell or casing $a$ when the portion $a'$ of the nozzle is seated within said shell. Bolts $a^4$ pass through the flange $a^3$ of the nozzle into the shell or casing, which secure the latter firmly in position. A flanged gasket, $c$, is fitted into the shell or casing $a$, slightly protruding from that face of the shell against which the opposing half of the coupling abuts, the end of the nozzle $a'$ being firmly pressed down against the gasket $c$ by the bolts $a^4$, to thereby keep the gasket in fixed position. An air-space, $b$, is formed between the outer side of the nozzle $a'$ and the inner side of the shell $a$, which is herein shown as made by recessing both the outer surface of the nozzle and the inner surface of the shell or casing, such air-space aiding to prevent quick condensation. A drip-passage, $b'$, leads from the air-space $b$ to provide suitable escape for any foreign matter that may possibly enter the space through the joint-connections.

The shell or casing $a$ is provided upon one side with a projection, $e$, having a groove, $e'$, upon one side and extending in the arc of a circle about the hinged joint-connection to be described as the center, and the said shell or casing $a$ is provided at the opposite side with a broad extension, $d$, which is provided with a recess, $d'$, of suitable shape to receive the projection $e$, the recess formed in the extension $d$ being of such shape as to leave a rib or flange, $d^2$, which enters the groove $e'$ of the projection $e$ of the opposing half of the coupling.

The shell $a$ is provided with a transverse rib, $f$, at the lower side of the abutting faces, and in line with the said projection $f$ the shell is grooved to receive a projection similar to $f$ of the opposing section, the two projections and grooves co-operating together to form a hinged joint about which the sections or halves may be turned as a center, or in one direction only—namely, upward.

By providing the coupling with locking devices $d$ and $e$, as described, the coupling is locked against lateral and downward separation, and can only be separated by an upward movement, and by the construction shown of each half, the coupling may be made cheaply and very durable.

I do not herein broadly claim a two-part hose-coupling composed of like halves or portions, each half having a steam-passage through it and an air-space surrounding the steam-passage, as the same forms the subject-matter of another application, Serial No. 254,065, filed November 2, 1887.

I claim—

1. A two-part hose-coupling composed of like halves or portions, each half consisting of the internally-recessed shell $a$, the flanged gasket $c$, the nozzle $a^2$, having the externally-recessed end $a'$, which enters the shell $a$, the nozzle-flange $a^3$, and fastening for securing the nozzle firmly to the shell or casing, substantially as described.

2. A two-part hose-coupling composed of like halves or portions, each half consisting of the shell and nozzle attached thereto, and means, as the fastening $a^4$, for attaching the shell and nozzle, substantially as described.

3. A two-part hose-coupling composed of like halves or portions, each half consisting of the shell $a$, a detachable nozzle fitted therein, and having a recess between the nozzle or shell provided with a drip-passage, substantially as and for the purpose set forth.

In testimony whereof I have signed my name to this specification in the presence of two subscribing witnesses.

JAMES H. SEWALL.

Witnesses:
BERNICE J. NOYES,
F. L. EMERY.